United States Patent
Kim et al.

(10) Patent No.: US 8,878,748 B2
(45) Date of Patent: *Nov. 4, 2014

(54) STEREOSCOPIC IMAGE DISPLAY CAPABLE OF SELECTIVELY IMPLEMENTING A TWO-DIMENSIONAL PLANE IMAGE AND A THREE-DIMENSIONAL STEREOSCOPIC IMAGE

(71) Applicant: LG Display Co., Ltd., Seoul (KR)

(72) Inventors: Seok Kim, Paju-si (KR); Kwangjo Hwang, Anyang-si (KR); Euitae Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 89 days.

This patent is subject to a terminal disclaimer.

(21) Appl. No.: 13/633,445

(22) Filed: Oct. 2, 2012

(65) Prior Publication Data

US 2013/0088418 A1    Apr. 11, 2013

(30) Foreign Application Priority Data

Oct. 6, 2011 (KR) .................... 10-2011-0102063

(51) Int. Cl.
*G09G 5/00* (2006.01)
*H04N 13/04* (2006.01)
*G09G 3/00* (2006.01)
*G09G 3/36* (2006.01)
*G02B 27/26* (2006.01)
*G02F 1/1343* (2006.01)
*G02F 1/1362* (2006.01)

(52) U.S. Cl.
CPC .... *G02B 27/26* (2013.01); *G02F 2001/134345* (2013.01); *H04N 13/0497* (2013.01); *H04N 13/0452* (2013.01); *G09G 3/003* (2013.01); *G09G 3/36* (2013.01); *H04N 13/0434* (2013.01); *G02F 1/13624* (2013.01); *G09G 3/3648* (2013.01)
USPC .................................................. 345/4; 345/6

(58) Field of Classification Search
CPC ..... G02B 27/00; G02B 27/22; G02B 27/2207
USPC ................ 345/1.1–9, 32; 349/15; 348/42–48; 353/7

See application file for complete search history.

(56) References Cited

U.S. PATENT DOCUMENTS

| | | | |
|---|---|---|---|
| 8,107,032 B2 * | 1/2012 | Tsubata | 349/48 |
| 2010/0265230 A1 * | 10/2010 | Kang | 345/211 |
| 2011/0234605 A1 * | 9/2011 | Smith et al. | 345/522 |

* cited by examiner

Primary Examiner — Ram Mistry
(74) Attorney, Agent, or Firm — Brinks Gilson & Lione

(57) ABSTRACT

A stereoscopic image display includes a display panel, which selectively displays a 2D image and a 3D image and includes a plurality of pixels, and a patterned retarder for dividing light from the display panel into first polarized light and second polarized light. Each of the pixels includes a main display unit including a first pixel electrode and a first common electrode, a subsidiary display unit including a second pixel electrode and a second common electrode, and a line unit disposed between the main display unit and the subsidiary display unit. The line unit includes a gate line, a discharge control line through which a discharge control voltage is applied to a discharge control TFT, and a lower common line through which a common voltage is applied to an upper common line.

8 Claims, 11 Drawing Sheets

(A) 2D MODE  (B) 3D MODE (A) 2D MODE (B) 3D MODE

STEREOSCOPIC IMAGE DISPLAY CAPABLE OF SELECTIVELY IMPLEMENTING A TWO-DIMENSIONAL PLANE IMAGE AND A THREE-DIMENSIONAL STEREOSCOPIC IMAGE

This application claims the benefit of Korean Patent Application No. 10-2011-0102063 filed on Oct. 6, 2011, the content of which is incorporated herein by reference in its entirety.

BACKGROUND

1. Field of the Invention

The present application relates to a stereoscopic image display capable of selectively implementing a two-dimensional plane image (hereinafter referred to as "2D image") and a three-dimensional stereoscopic image (hereinafter referred to as "3D image").

2. Discussion of the Related Art

Recently, a stereoscopic image display capable of selectively implementing a 2D image and a 3D image has been developed and has been put on the market due to the development of various contents and circuit technology. Examples of a method for implementing the 3D image of the stereoscopic image display roughly include a stereoscopic technique and an auto-stereoscopic technique.

The stereoscopic technique, which uses a parallax image between left and right eyes of a user with a high stereoscopic effect, includes a glasses type method and a non-glasses type method, both of which have been put to practical use. In the non-glasses type method, an optical plate such as a parallax barrier for separating an optical axis of the parallax image between the left and right eyes is generally installed in front of or behind a display screen. In the glasses type method, left and right eye images, each of which has a different polarization direction, are displayed on a display panel, and a stereoscopic image is implemented using polarized glasses or liquid crystal (LC) shutter glasses.

An LC shutter glasses type stereoscopic image display alternately displays a left eye image and a right eye image on a display element every one frame and opens and closes a left eyeglass and a right eyeglass of LC shutter glasses in synchronization with a display timing, thereby implementing the 3D image. In the LC shutter glasses type stereoscopic image display, because the LC shutter glasses are turned on in a short period of time, a luminance of the 3D image is low. Further, a 3D crosstalk is extremely generated because of the synchronization between the display element and the LC shutter glasses and the ON/OFF conversion response characteristic.

In a polarized-glasses-type stereoscopic image display, a polarization separation device such as a patterned retarder is attached to a display panel. The patterned retarder separates the polarization of a left eye image and a right eye image displayed on the display panel. When a viewer views a stereoscopic image of the polarized glasses type stereoscopic image display using polarized glasses, the viewer sees the polarization of the left eye image through a left eye filter of the polarized glasses and sees the polarization of the right eye image through a right eye filter of the polarized glasses. Hence, the viewer may feel a stereoscopic feeling.

In the prior art polarized-glasses-type stereoscopic image display, a liquid crystal display panel may be used as the display panel. The prior art polarized glasses type stereoscopic image display provides a narrow vertical viewing angle due to the parallax between a pixel array of the liquid crystal display panel and the patterned retarder resulting from a thickness of an upper glass substrate of the liquid crystal display panel and a thickness of an upper polarizing plate. When the viewer views the stereoscopic image displayed on the polarized glasses type stereoscopic image display at a vertical viewing angle greater or less than an angle corresponding to the front of the liquid crystal display panel, the viewer may feel the 3D crosstalk in which the viewer sees a doubled image of the left and right eye images when viewing through one eye (the left eye or the right eye).

To solve the problem of the 3D crosstalk resulting from the narrow vertical viewing angle in the polarized-glasses-type stereoscopic image display, Japanese Laid Open Publication No. 2002-185983 proposed a method for forming black stripes on a patterned retarder (or 3D film) of a stereoscopic image display. Alternatively, there is a method for increasing a width of a black matrix formed on a liquid crystal display panel. However, the black stripes formed on the patterned retarder may reduce a luminance of 2D and 3D images and may interact with the black matrix to thereby cause moiré. The method for increasing the width of the black matrix reduces an aperture ratio and thus reduces the luminance of the 2D and 3D images.

To solve the problems of the stereoscopic image display disclosed in Japanese Laid Open Publication No. 2002-185983, Korean Patent Application No. 2009-0033534, filed on Apr. 17, 2009 and U.S. patent application Ser. No. 12/536,031, filed on Aug. 5, 2009, proposed a technique for dividing each of pixels of a display panel into two parts and using one of the two parts of each pixel as an active black stripe. The stereoscopic image display disclosed in the above-mentioned Korean and U.S. applications can prevent a reduction in the luminance of the 2D image by dividing each pixel into the two parts and displaying the 2D image on the two parts of each pixel in the 2D mode. Further, the stereoscopic image display can increase the vertical viewing angle of the 3D image by displaying the 3D image on one of the two parts of each pixel and displaying a black image on the other part in the 3D mode. However, in the stereoscopic image display using the active black stripe, the number of gate lines is doubled because each pixel is divided into the two parts. Hence, configuration of a gate driver is complicated.

BRIEF SUMMARY

Embodiments of the invention provide a stereoscopic image display capable of improving a luminance of a 2D image and a vertical viewing angle of a 3D image without an increase in the number of gate lines.

In one aspect, a stereoscopic image display includes a display panel configured to selectively display a 2D image and a 3D image, the display panel including a plurality of pixels, and a patterned retarder configured to divide light from the display panel into first polarized light and second polarized light, wherein each of the plurality of pixels includes a main display unit including a first pixel electrode connected to a data line through a first thin film transistor (TFT) and a first common electrode which is opposite to the first pixel electrode and is connected to an upper common line, a subsidiary display unit including a second pixel electrode, which is connected to the data line through a second TFT and is connected to the upper common line through a discharge control TFT, and a second common electrode which is opposite to the second pixel electrode and is connected to the upper common line, and a line unit disposed between the main display unit and the subsidiary display unit, the line unit including a gate line through which a scan pulse is commonly applied to the first TFT and the second TFT, a discharge control line through which a discharge control voltage is applied to the discharge control TFT, and a lower common line through which a common voltage is applied to the upper common line, wherein a first storage capacitor of the main display unit and a second storage capacitor of the subsidiary display unit are formed on the lower common line.

In another aspect, a stereoscopic image display includes a display panel configured to selectively display a 2D image and a 3D image, the display panel including a plurality of pixels, and a patterned retarder configured to divide light from the display panel into first polarized light and second polarized light, wherein each of the plurality of pixels includes a main display unit including a first pixel electrode connected to a data line through a first thin film transistor (TFT) and a first common electrode which is opposite to the first pixel electrode and is connected to an upper common line, a subsidiary display unit including a second pixel electrode, which is connected to the data line through a second TFT and is connected to the upper common line through a discharge control TFT, and a second common electrode which is opposite to the second pixel electrode and is connected to the upper common line, and a line unit disposed between the main display unit and the subsidiary display unit, the line unit including a gate line through which a scan pulse is commonly applied to the first TFT and the second TFT, a discharge control line through which a discharge control voltage is applied to the discharge control TFT, and a lower common line through which a common voltage is applied to the upper common line, wherein a first storage capacitor of the main display unit is formed on the lower common line, and a second storage capacitor of the subsidiary display unit is formed on the discharge control line.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure. In the drawings.

DETAILED DESCRIPTION OF THE DRAWINGS AND THE PRESENTLY PREFERRED EMBODIMENTS

Reference will now be made in detail to embodiments of the present disclosure, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the present disclosure.

Exemplary embodiments of the present disclosure will be described with reference to FIGS. 1 to 12C.

Figure 1:
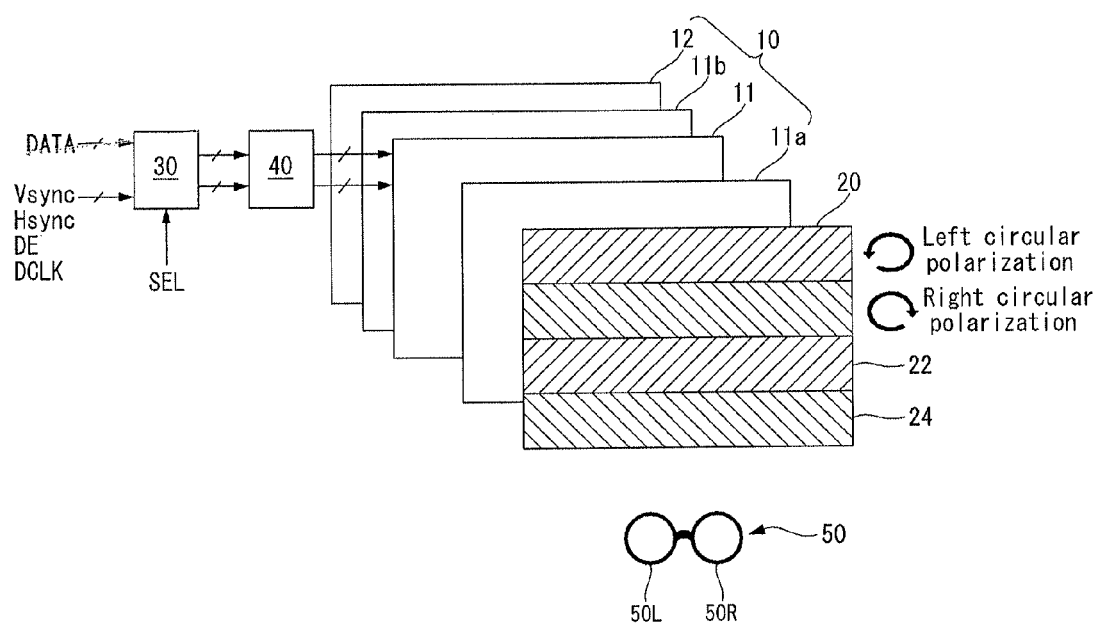
FIGS. 1 and 2 illustrate a polarized glasses type stereoscopic image display according to an exemplary embodiment of the present disclosure.
Figure 2:
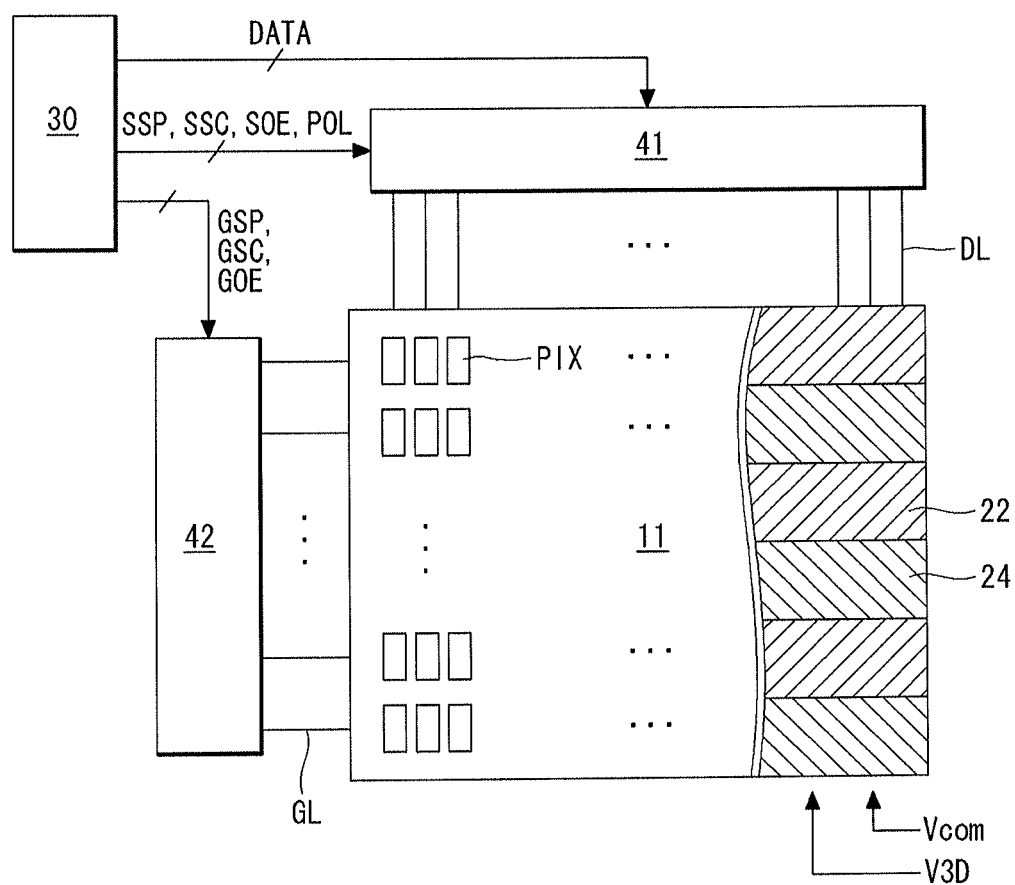
Figure 3:
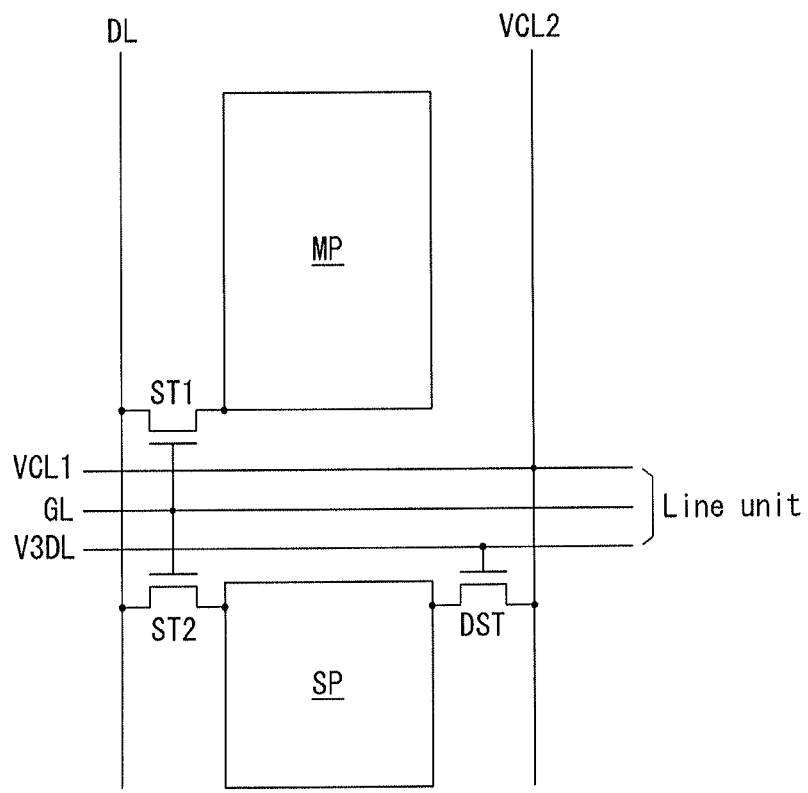
FIG. 3 illustrates one of a plurality of pixels shown in FIG. 2.
Figure 4:
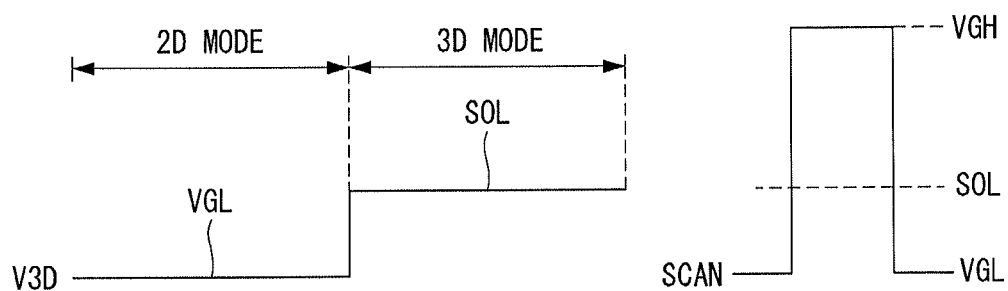
FIG. 4 illustrates a generation level of a discharge control voltage depending on a driving mode.
Figure 5:
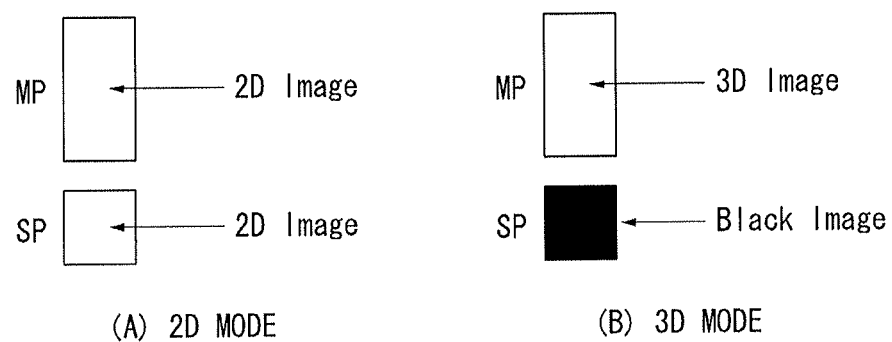
FIG. 5 illustrates a display image of a pixel in a 2D mode and a 3D mode.

FIGS. 1 and 2 illustrate a polarized glasses type stereoscopic image display according to an exemplary embodiment of the present disclosure. FIG. 3 illustrates one of a plurality of pixels shown in FIG. 2. FIG. 4 illustrates a generation level of a discharge control voltage depending on a driving mode. FIG. 5 illustrates a display image of a pixel in a 2D mode and a 3D mode.

As shown in FIGS. 1 to 5, the stereoscopic image display according to the embodiment of the present disclosure includes a display element 10, a patterned retarder 20, a controller 30, a panel driving circuit 40, and polarized glasses 50.

The display element 10 may be implemented as a flat panel display such as a liquid crystal display, a field emission display (FED), a plasma display panel (PDP) display, an electroluminescence device (EL) including an inorganic electroluminescence element and an organic light emitting diode (OLED), and an electrophoretic display (EPD). In the following description, the stereoscopic image display according to the embodiment of the present disclosure is described using the liquid crystal display as the display element 10.

The display element 10 includes a display panel 11, an upper polarizing film 11*a*, and a lower polarizing film 11*b*.

The display panel 11 displays a 2D image in a 2D mode and displays a 3D image in a 3D mode. The display panel 11 includes an upper glass substrate, a lower glass substrate, and a liquid crystal layer between the upper and lower glass substrates. A plurality of data lines DL, a plurality of gate lines GL crossing the plurality of data lines DL, a lower common line VCL1 and an upper common line VCL2 both of which are electrically connected to each other and are supplied with a common voltage Vcom, a discharge control line V3DL which is supplied with a discharge control voltage V3D, etc., are disposed on the lower glass substrate of the display panel 11.

Black matrixes and color filters are formed on the upper glass substrate of the display panel 11. The upper polarizing film 11*a* is attached to the upper glass substrate of the display panel 11, and the lower polarizing film 11*b* is attached to the lower glass substrate of the display panel 11. Alignment layers for setting a pre-tilt angle of liquid crystals are respectively formed on the upper and lower glass substrates of the display panel 11. In a vertical electric field driving manner such as a twisted nematic (TN) mode and a vertical alignment (VA) mode, common electrodes, to which the common voltage Vcom is supplied, may be formed on the upper glass substrate. In a horizontal electric field driving manner such as an in-plane switching (IPS) mode and a fringe field switching (FFS) mode, the common electrodes may be formed on the lower glass substrate along with pixel electrodes. A column spacer may be formed between the upper and lower glass substrates to keep cell gaps of liquid crystal cells of the display panel 11 constant.

The display element 10 according to the embodiment of the present disclosure may be implemented as any type liquid crystal display including a transmissive liquid crystal display, a transflective liquid crystal display, and a reflective liquid crystal display. A backlight unit 12 is necessary in the transmissive liquid crystal display and the transflective liquid crystal display. The backlight unit 12 may be implemented as a direct type backlight unit or an edge type backlight unit.

A plurality of unit pixels are disposed on the display panel 11 based on a crossing structure between the data lines DL and the gate lines GL, thereby constituting a pixel array. Each of the plurality of unit pixels includes three pixels PIX respectively displaying red (R), green (G), and blue (B) images. As shown in FIG. 3, each pixel PIX includes a main display unit MP and a subsidiary display unit SP on the opposite sides of a line unit which is interposed between the main display unit MP and the subsidiary display unit SP. The subsidiary display unit SP serves as an active black stripe. The lower common line VCL1, the gate line GL, and the discharge control line V3DL included in the line unit cross between the main display unit MP and the subsidiary display unit SP.

The main display unit MP is connected to the data line DL through a first thin film transistor (TFT) ST1. The subsidiary display unit SP is connected to the data line DL through a second TFT ST2 and also is connected to the upper common line VCL2 through a discharge control TFT DST. The first TFT ST1 and the second TFT ST2 are simultaneously turned on or off in response to a scan pulse SCAN (shown in FIG. 4) from the gate line GL. The scan pulse SCAN swings between a gate low voltage VGL and a gate high voltage VGH. The discharge control TFT DST is turned on or off in response to the discharge control voltage V3D supplied through the discharge control line V3DL.

As shown in FIG. 4, the discharge control voltage V3D is generated at different voltage levels in response to a mode selection signal SEL. More specifically, in the 2D mode, the discharge control voltage V3D may be generated at the same voltage level as the gate low voltage VGL capable of turning off the discharge control TFT DST. In the 3D mode, the discharge control voltage V3D may be generated at a slight-on level SOL, which is higher than the gate low voltage VGL and is lower than the gate high voltage VGH, capable of turning on the discharge control TFT DST. A channel resistance of the discharge control TFT DST in a slight on state is greater than a channel resistance of the discharge control TFT DST in a full-on state. Namely, an amount of current flowing between a source electrode and a drain electrode of the discharge control TFT DST in the slight-on state is less than an amount of current flowing between the source electrode and the drain electrode of the discharge control TFT DST in the full-on state. In the 3D mode, the discharge control voltage V3D may be periodically reduced to the gate low voltage VGL, so as to reduce the degradation of the discharge control TFT DST. This is disclosed in detail in Korean Patent Application Nos. 10-2011-0070327, filed on Jul. 15, 2011, and 10-2011-0090874, filed on Sep. 7, 2011, which are commonly assigned to the assignee of the present application, and which are hereby incorporated by reference in their entirety. When the gate low voltage VGL is about −5V to 0V and the gate high voltage VGH is about 25V to 30V, a voltage of the slight-on level SOL may be about 8V to 12V.

As shown in FIG. 5, the main display unit MP displays video data of the 2D image in the 2D mode and displays video data of the 3D image in the 3D mode. On the other hand, the subsidiary display unit SP displays the video data of the 2D image in the 2D mode and displays an image of a black gray level to thereby serve as the active black stripe in the 3D mode. The subsidiary display unit SP increases an aperture ratio and a luminance of the 2D image in the 2D mode and increases a vertical viewing angle of the 3D image in the 3D mode. The sizes and shapes of the main display unit MP and the subsidiary display unit SP of one pixel PIX may be properly designed in consideration of the panel driving characteristics, a luminance of a display image, the vertical viewing angle of the 3D image, applied product, etc.

As shown in FIG. 1, the patterned retarder 20 is attached to the upper polarizing film 11a of the display panel 11. A first pattern 22 is formed on odd-numbered lines of the patterned retarder 20, and a second pattern 24 is formed on even-numbered lines of the patterned retarder 20. A light absorption axis of the first pattern 22 is different from a light absorption axis of the second pattern 24. The first pattern 22 is opposite to odd-numbered horizontal pixel lines of the pixel array, and the second pattern 24 is opposite to even-numbered horizontal pixel lines of the pixel array. The first pattern 22 retards a phase of linearly polarized light incident through the upper polarizing film 11a by quarter wavelength and transmits it as first polarized light (for example, left-circularly polarized light). The second pattern 24 retards a phase of linearly polarized light incident through the upper polarizing film 11a by three-quarter wavelength and transmits it as second polarized light (for example, right-circularly polarized light).

The controller 30 controls an operation of the panel driving circuit 40 in the 2D mode and the 3D mode in response to the mode selection signal SEL. The controller 30 receives the mode selection signal SEL through a user interface such as a touch screen, an on-screen display (OSD), a keyboard, a mouse, and a remote controller. The controller 30 may switch between an operation of the 2D mode and an operation of the 3D mode in response to the mode selection signal SEL. The controller 30 detects a 2D/3D identification code encoded in data of an input image, for example, a 2D/3D identification code capable of being coded in an electronic program guide (EPG) or an electronic service guide (ESG) of a digital broadcasting standard, thereby distinguishing between the 2D mode and the 3D mode.

In the 3D mode, the controller 30 divides the video data of the 3D image received from a video source into RGB data of a left eye image and RGB data of a right eye image and then supplies the RGB data of the left eye image and the RGB data of the right eye image to a data driver 41 of the panel driving circuit 40. For this, the controller 30 may include a 3D formatter (not shown). In the 2D mode, the controller 30 supplies RGB data of a 2D image received from the video source to the data driver 41. The controller 30 may include a 3D board (not shown) for generating the discharge control voltage V3D.

The controller 30 generates control signals for controlling operation timing of the panel driving circuit 40 using timing signals such as a vertical sync signal Vsync, a horizontal sync signal Hsync, a data enable signal DE, and a dot clock DCLK.

A data control signal for controlling operation timing of the data driver 41 includes a source start pulse SSP, a source sampling clock SSC, a source output enable SOE, a polarity control signal POL and the like. The source start pulse SSP indicates a supply start time point of data corresponding to one horizontal line in one horizontal period during which the data corresponding to the one horizontal line is displayed. The source sampling clock SSC controls a latch operation of data based on a rising or falling edge thereof. The source output enable SOE controls an output of the data driver 41. The polarity control signal POL controls a polarity of a data voltage to be supplied to the liquid crystal cells of the display panel 11.

A gate control signal for controlling operation timing of a gate driver 42 of the panel driving circuit 40 includes a gate start pulse GSP, a gate shift clock GSC, a gate output enable GOE and the like. The gate start pulse GSP indicates a start horizontal line of a scan operation in one vertical period during which one screen is displayed. The gate shift clock GSC is inputted to a shift register inside the gate driver 42 and sequentially shifts the gate start pulse GSP. The gate output enable GOE controls an output of the gate driver 42.

The controller 30 multiplies the frequency of the timing signals Vsync, Hsync, DE, and DCLK synchronized with an input frame frequency by N to obtain a frame frequency of (f×N) Hz, wherein N is a positive integer equal to or greater than 2 and f is the input frame frequency. Hence, the controller 30 may control the operation of the panel driving circuit 40 based on the frame frequency of (f×N) Hz. The input frame frequency is 50 Hz in a phase alternate line (PAL) scheme and is 60 Hz in a national television standards committee (NTSC) scheme.

The panel driving circuit 40 includes the data driver 41 for driving the data lines DL of the display panel 11 and the gate driver 42 for driving the gate lines GL of the display panel 11.

The data driver 41 includes a plurality of driving integrated circuits (ICs). Each of the plurality of driving ICs includes a shift register, a latch, a digital-to-analog converter (DAC), an output buffer, etc. The data driver 41 latches the RGB data of the 2D or 3D image in response to the data control signals SSP, SSC and SOE. The data driver 41 converts the RGB data of the 2D or 3D image into analog positive and negative gamma compensation voltages in response to the polarity control signal POL and inverts a polarity of the data voltage. The data driver 41 outputs the data voltage to the data lines DL, so that the data voltage is synchronized with a scan pulse (or a gate pulse) outputted from the gate driver 42. The driving ICs of the data driver 41 may be bonded to the lower glass substrate of the display panel 11 through a tape automated bonding (TAB) process.

The gate driver 42 generates the scan pulse, which swings between the gate high voltage VGH and the gate low voltage VGL, in response to the gate control signals GSP, GSC and GOE. The gate driver 42 supplies the scan pulse to the gate lines GL in a line sequential manner in response to the gate control signals GSP, GSC and GOE. The gate driver 42 includes a gate shift register array, etc. The gate shift register array of the gate driver 42 may be formed in a non-display area outside a display area of the display panel 11, in which the pixel array is formed, in a gate-in-panel (GIP) manner. A plurality of gate shift registers included in the gate shift register array may be formed with along the pixel array in a TFT process of the pixel array in the GIP manner. The gate shift register array of the gate driver 42 may be implemented as a plurality of driving ICs bonded to the lower glass substrate of the display panel 11 through the TAB process.

The panel driving circuit 40 comprises a power circuit (not shown), a discharge control voltage generation circuit, etc. The power circuit generates panel driving voltages, such as the common voltage Vcom, the gate high voltage VGH, the gate low voltage VGL, positive/negative gamma reference voltages and the slight-on level voltage Vsol, to be supplied to the display panel 11. The power circuit may be implemented as a DC-DC converter. The discharge control voltage generation circuit outputs the same discharge control voltage V3D as shown in FIG. 4 under the control of the controller 30. The discharge control voltage generation circuit may be implemented as a power switching device for switching the slight-on level voltage Vsol and the gate low voltage VGL.

The polarized glasses 50 include a left eyeglass 50L having a left eye polarizing filter and a right eyeglass 50R having a right eye polarizing filter. The left eye polarizing filter has the same light absorption axis as the first pattern 22 of the patterned retarder 20, and the right eye polarizing filter has the same light absorption axis as the second pattern 24 of the patterned retarder 20. For example, a left circular polarizing filter may be selected as the left eye polarizing filter of the polarized glasses 50, and a right circular polarizing filter may be selected as the right eye polarizing filter of the polarized glasses 50. When a viewer wears the polarized glasses 50, he or she views only the left eye image through his or her left eye and views only the right eye image through his/her right eye. As a result, he/she may feel a stereoscopic feeling through a binocular disparity.

Figure 6:
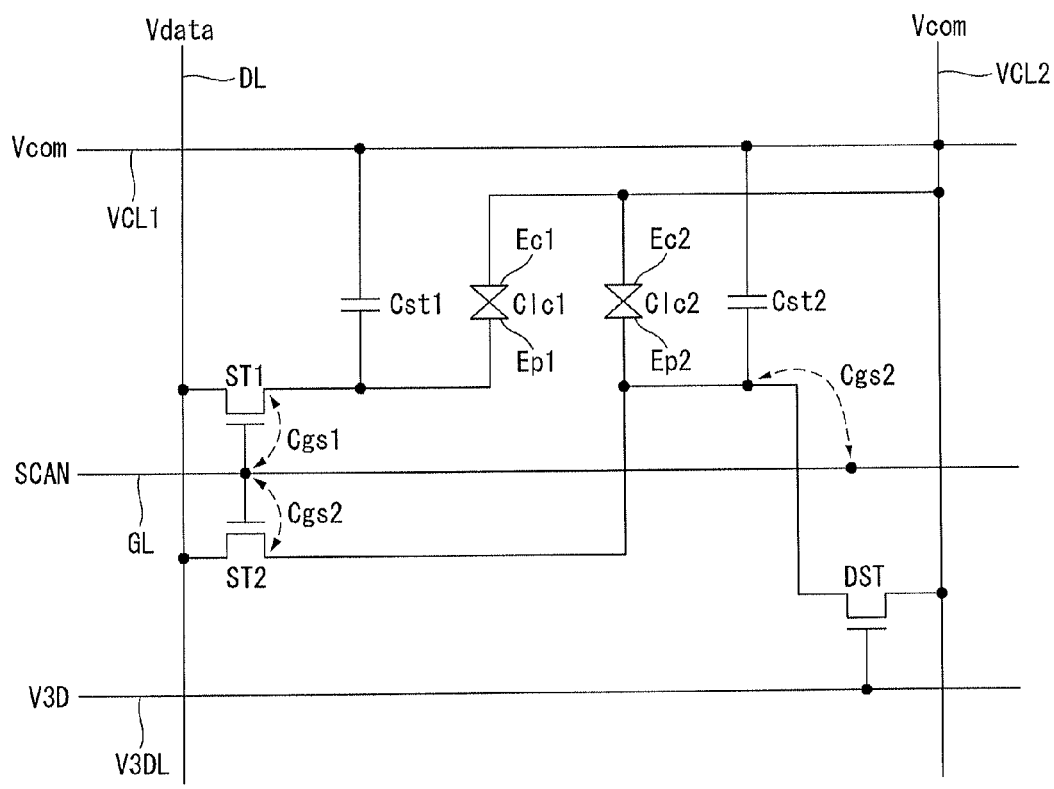
FIG. 6 is an equivalent circuit diagram of a pixel according to an exemplary embodiment of the present disclosure.
Figure 7:
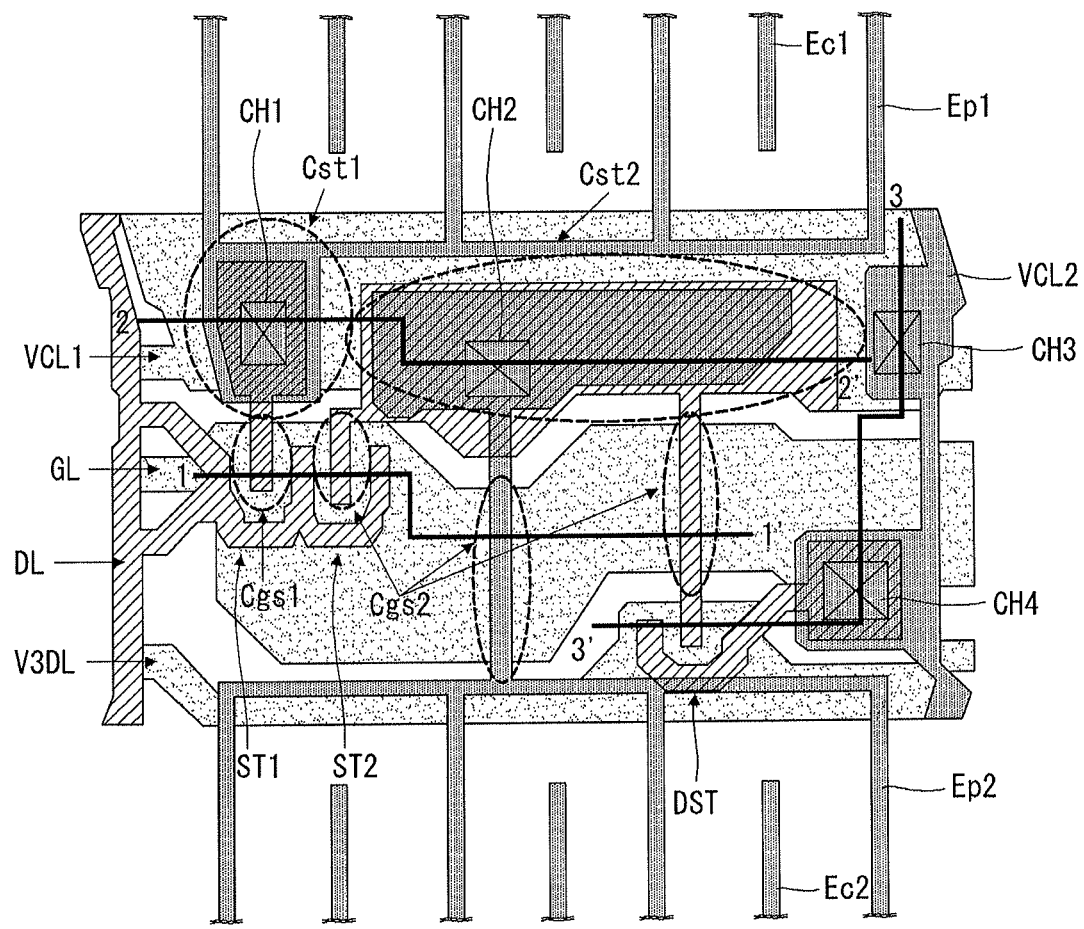
FIG. 7 illustrates a line unit of a pixel having a circuit configuration shown in FIG. 6.
Figure 8A:
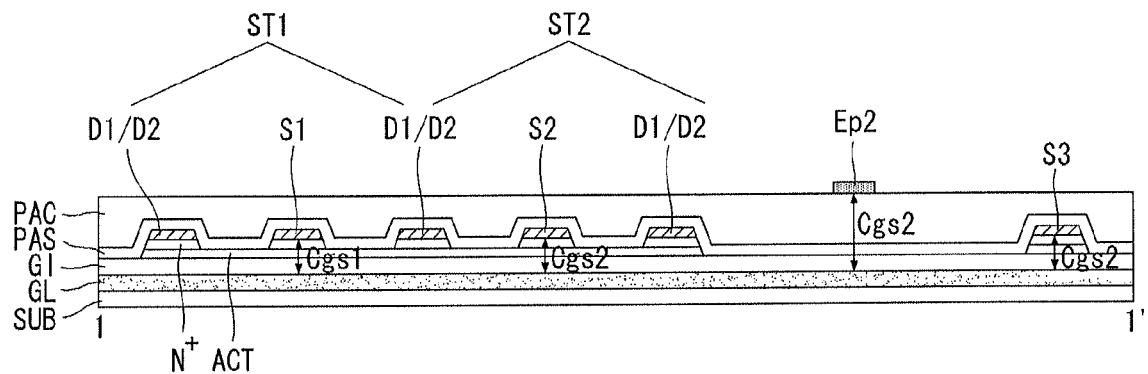
FIG. 8A is a cross-sectional view taken along line 1-1' of FIG. 7.
Figure 8B:
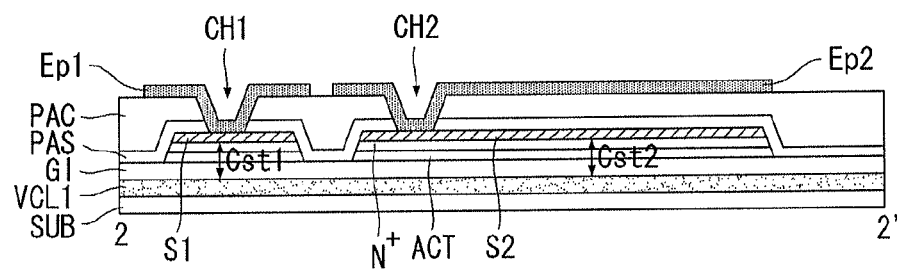
FIG. 8B is a cross-sectional view taken along line 2-2' of FIG. 7.
Figure 8C:
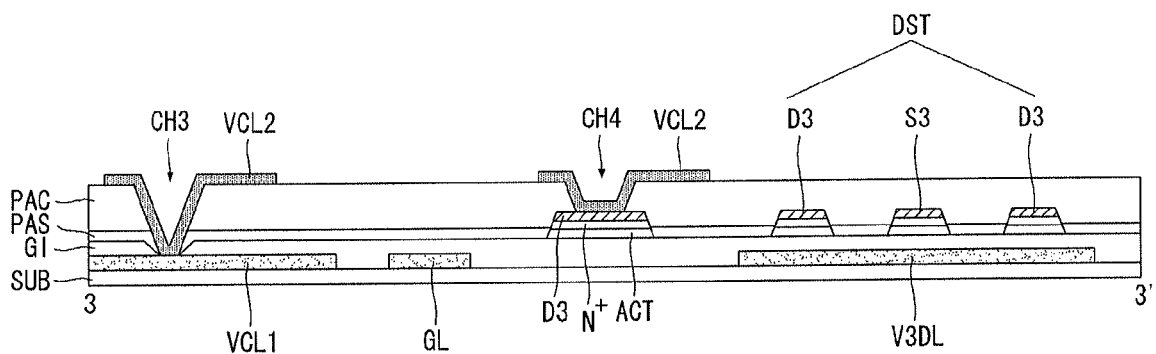
FIG. 8C is a cross-sectional view taken along line 3-3' of FIG. 7.

FIG. 6 is an equivalent circuit diagram of the pixel according to the embodiment of the present disclosure. FIG. 7 is a plane view illustrating in detail the line unit (refer to FIG. 3) of the pixel having a circuit configuration shown in FIG. 6. FIG. 8A is a cross-sectional view taken along line 1-1' of FIG. 7. FIG. 8B is a cross-sectional view taken along line 2-2' of FIG. 7. FIG. 8C is a cross-sectional view taken along line 3-3' of FIG. 7. In FIGS. 8A to 8C, "ACT" denotes an active layer for forming a channel between a source electrode and a drain electrode of a TFT, "N$^+$" denotes an ohmic contact layer for forming an ohmic contact between the active layer and the source electrode of the TFT and for forming an ohmic contact between the active layer and the drain electrode of the TFT, and 'SUB' denotes the lower glass substrate. The active layer ACT and the ohmic contact layer N+ constitute a semiconductor layer.

As shown in FIGS. 6 to 8C, the main display unit MP includes a first pixel electrode Ep1 and a first common electrode Ec1 which are opposite to each other and form a first liquid crystal (LC) capacitor Clc1. The first pixel electrode Ep1 is connected to the data line DL through a first TFT ST1. The first TFT ST1 is turned on in response to the scan pulse SCAN from the gate line GL and thus applies a data voltage Vdata on the data line DL to the first pixel electrode Ep1. A gate electrode of the first TFT ST1 is connected to the gate line GL, a drain electrode D1 of the first TFT ST1 is connected to the data line DL, and a source electrode S1 of the first TFT ST1 is connected to the first pixel electrode Ep1 through a first contact hole CH1 passing through an organic insulating layer PAC and an inorganic insulating layer PAS. The source electrode S1 of the first TFT ST1 overlaps the lower common line VCL1 with the gate insulating layer GI and the semiconductor layer (including the active layer ACT and the ohmic contact layer N+) interposed between the source electrode S1 and the lower common line VCL1 to form a first storage capacitor Cst1. The first storage capacitor Cst1 uniformly holds a charge voltage of the first LC capacitor Clc1 for a predetermined period of time. The first common electrode Ec1 is connected to the upper common line VCL2 supplied by the common voltage Vcom. The upper common line VCL2 is connected to the lower common line VCL1 through a third contact hole CH3 passing through the organic insulating layer PAC, the inorganic insulating layer PAS, and the gate insulating layer GI. Hence, the common voltage Vcom from the lower common line VCL1 is supplied to the upper common line VCL2.

The subsidiary display unit SP includes a second pixel electrode Ep2 and a second common electrode Ec2 both of which are opposite to each other and between both of which a second LC capacitor Clc2 is formed. The second pixel electrode Ep2 is connected to the data line DL through a second TFT ST2. The second TFT ST2 is turned on in response to the scan pulse SCAN from the gate line GL and thus applies the data voltage Vdata on the data line DL to the second pixel electrode Ep2. A gate electrode of the second TFT ST2 is connected to the gate line GL, a drain electrode D2 of the second TFT ST2 is connected to the data line DL, and a source electrode S2 of the second TFT ST2 is connected to the second pixel electrode Ep2 through a second contact hole CH2 passing through the organic insulating layer PAC and the inorganic insulating layer PAS. The drain electrode D2 of the second TFT ST2 is connected to the drain electrode D1 of the first TFT ST1. The source electrode S2 of the second TFT ST2 overlaps the lower common line VCL1 with the gate insulating layer GI and the semiconductor layer (including the active layer ACT and the ohmic contact layer N+) interposed between the source electrode S2 and the lower common line VCL1 to form a second storage capacitor Cst2. The second storage capacitor Cst2 uniformly holds a charge voltage of the second LC capacitor Clc2 for a predetermined period of time. The second common electrode Ec2 is connected to the upper common line VCL2 supplied by the common voltage Vcom.

The second pixel electrode Ep2 is connected to the upper common line VCL2 through the discharge control TFT DST. The discharge control TFT DST switches on or off a current path between the second pixel electrode Ep2 and the upper common line VCL2 in response to the discharge control voltage V3D. A gate electrode of the discharge control TFT DST is connected to the discharge control line V3DL, a source electrode S3 of the discharge control TFT DST is connected to the second pixel electrode Ep2, and a drain electrode D3 of the discharge control TFT DST is connected to the upper common line VCL2 through a fourth contact hole CH4 passing through the organic insulating layer PAC. The source electrode S3 of the discharge control TFT DST is connected to the drain electrode D2 of the second TFT ST2.

The gate line GL, the discharge control line V3DL, and the lower common line VCL1 may be formed on the same level layer. Further, the first and second pixel electrodes Ep1 and Ep2, the first and second common electrodes Ee1 and Ec2 and the upper common line VCL2 may be formed on the same level layer.

In the 2D mode, when the discharge control voltage V3D of the same level as the gate low voltage VGL is applied, the discharge control TFT DST completely closes a source-drain channel of the discharge control TFT DST and cuts off the current path between the second pixel electrode Ep2 and the upper common line VCL2. In the 3D mode, when the discharge control voltage V3D of the same level as the slight-on level SOL is applied, the discharge control TFT DST partially opens the source-drain channel of the discharge control TFT DST and partially allows the current path between the second pixel electrode Ep2 and the upper common line VCL2 is formed.

The discharge control TFT DST is designed, so that it has the same channel capacitance as the first and second TFTs ST1 and ST2. The discharge control TFT DST is turned on by the voltage of the slight-on level SOL lower than the full-on level by applying the discharge control voltage V3D of the slight-on level SOL lower than the gate high voltage VGH to the discharge control line V3DL. Even if the second TFT ST2 and the discharge control TFT DST are simultaneously turned on, an amount of current flowing through the discharge control TFT DST is less than an amount of current flowing through the second TFT ST2. Namely, a channel resistance of the discharge control TFT DST is greater than a channel resistance of the second TFT ST2 even if the second TFT ST2 and the discharge control TFT DST are simultaneously turned on. This is because the channel resistance of the TFT is inversely proportional to the voltage applied to the gate electrode of the TFT.

Figure 9:
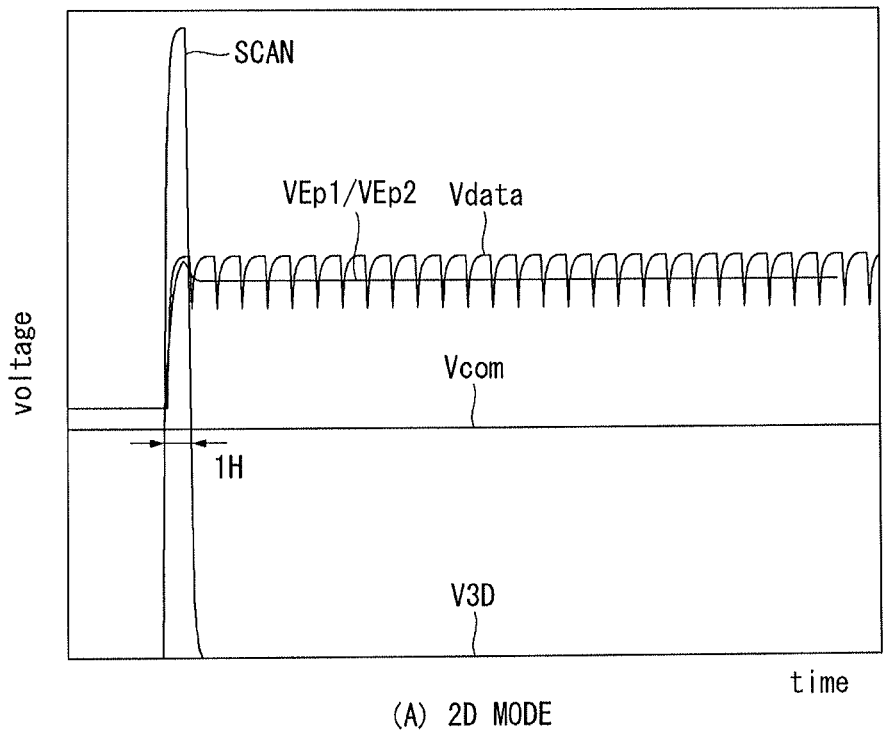
FIG. 9 illustrates charge and discharge waveforms of a pixel in each driving mode.
Figure 9:
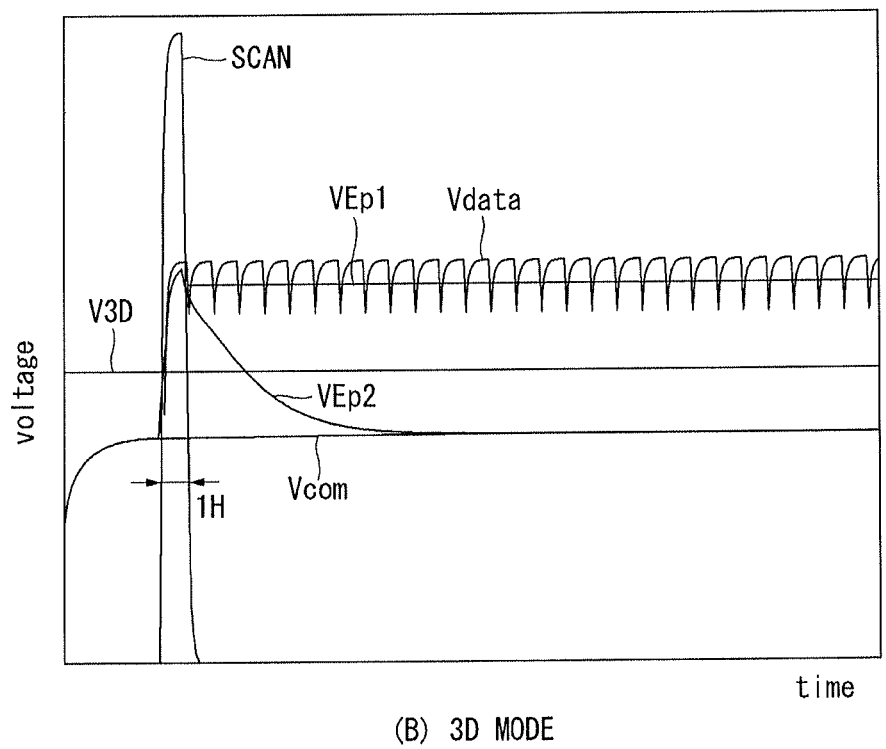

FIG. 9 illustrates charge and discharge waveforms of the pixel having the configuration shown in FIGS. 6 to 8C in each driving mode.

An operation and an operational effect of the pixel PIX in each driving mode are described with reference to FIGS. 6 to 9.

First, an operation and an operational effect of the pixel PIX in the 2D mode are described.

In the 2D mode, the discharge control voltage V3D may be generated at the same level as the gate low voltage VGL of the scan pulse SCAN. The discharge control TFT DST is continuously maintained in a turn-off state in response to the discharge control voltage V3D having the same level as the gate low voltage VGL.

The first and second TFTs ST1 and ST2 are simultaneously turned on at the full-on level during a period (hereinafter referred to as a T1 period) in which the scan pulse SCAN supplied is at the gate high voltage VGH. The first pixel electrode Ep1 of the main display unit MP is charged by a first pixel voltage VEp1 as the data voltage Vdata for the display of the 2D image due to a turn-on operation of the first TFT ST1. The second pixel electrode Ep2 of the subsidiary display unit SP is charged by a second pixel voltage VEp2 as the data voltage Vdata for the display of the 2D image due to a turn-on operation of the second TFT ST2.

The first and second TFTs ST1 and ST2 are simultaneously turned off during a period (hereinafter referred to as a T2 period) in which the scan pulse SCAN is supplied at the gate low voltage VGL. When the first TFT ST1 is turned off, the first pixel voltage VEp1, which has been supplied to the first pixel electrode Ep1 of the main display unit MP, is shifted by a predetermined value because of an influence of a kickback voltage and then is maintained at a shifted value by the first storage capacitor Cst1. When the second TFT ST2 is turned off, the second pixel voltage VEp2, which has been supplied to the second pixel electrode Ep2 of the subsidiary display unit SP, is shifted by a predetermined value because of the influence of the kickback voltage and then is maintained at a shifted value by the second storage capacitor Cst2.

During the T1 and T2 periods, the common voltage Vcom is applied to the first common electrode Ec1 of the main display unit MP and the second common electrode Ec2 of the subsidiary display unit SP through the upper common line VCL2. A difference between the first pixel voltage VEp1 and the common voltage Vcom may be maintained to be substantially equal to a difference between the second pixel voltage VEp2 and the common voltage Vcom. A transmittance of the liquid crystal cells is proportional to a voltage difference between the pixel electrode and the common electrode in a normally black liquid crystal mode. As a result, as shown in (A) of FIG. 5, the main display unit MP and the subsidiary display unit SP display the 2D image of the same gray level. The 2D image displayed on the subsidiary display unit SP functions to increase the luminance of the 2D image.

Next, an operation and an operational effect of the pixel PIX in the 3D mode are described.

In the 3D mode, the discharge control voltage V3D may be generated at the slight-on level SOL. The discharge control TFT DST is continuously maintained in a slight-on state in response to the discharge control voltage V3D of the slight-on level SOL.

During the T1 period, the first and second TFTs ST1 and ST2 are simultaneously turned on at the full-on level in response to the scan pulse SCAN of the gate high voltage VGH. The first pixel electrode Ep1 of the main display unit MP is charged by the first pixel voltage VEp1 as the data voltage Vdata for the display of the 3D image due to the turn-on operation of the first TFT ST1. The second pixel electrode Ep2 of the subsidiary display unit SP is charged by the second pixel voltage VEp2 as the data voltage Vdata for the display of the 3D image due to the turn-on operation of the second TFT ST2. During the T1 period, the channel resistance of the discharge control TFT DST having the on-state of the slight-on level is much greater than the channel resistance of the second TFT ST2 having the on-state of the full-on level. Hence, a discharge current drained from the second pixel electrode Ep2 is much less than a charge current supplied to the second pixel electrode Ep2. As a result, during the T1 period, the discharge control TFT DST having the ON-state of the slight-on level hardly affects the charge characteristic of the second pixel voltage VEp2.

During the T2 period, the first and second TFTs ST1 and ST2 are simultaneously turned off in response to the scan pulse SCAN of the gate low voltage VGL. When the first TFT ST1 is turned off, the first pixel voltage VEp1, which has been supplied to the first pixel electrode Ep1 of the main display unit MP, is shifted by a predetermined value because of the influence of the kickback voltage and then is maintained at a shifted value by the first storage capacitor Cst1. When the second TFT ST2 is turned off, the second pixel voltage VEp2, which has been supplied to the second pixel electrode Ep2 of the subsidiary display unit SP, is reduced to the level of the common voltage Vcom for a predetermined period of time because of the discharge current drained via the discharge control TFT DST. The channel resistance of the discharge control TFT DST having the on-state of the slight-on level is much less than the channel resistance of the second TFT ST2 having the off-state. As a result, the second pixel voltage VEp2, which has been supplied to the second pixel electrode Ep2 of the subsidiary display unit SP, is gradually reduced to the level of the common voltage Vcom without the influence of the kickback voltage through the operation of the discharge control TFT DST.

Unlike the difference between the first pixel voltage VEp1 and the common voltage Vcom, a difference between the second pixel voltage VEp2 and the common voltage Vcom becomes substantially zero when the discharge of the second pixel electrode Ep2 is completed. As a result, as shown in (B) of FIG. 5, according to the voltage difference-transmittance characteristic in the normally black liquid crystal mode, the main display unit MP displays the 3D image of a predetermined gray level and the subsidiary display unit SP displays an image of a black gray level. Thus, the subsidiary display unit SP serves as the active black stripe. The black image displayed on the subsidiary display unit SP increases a display distance between the 3D images (i.e., between the left eye image and the right eye image), which are adjacent to each other in a vertical direction. Hence, the vertical viewing angle of the 3D image, at which a crosstalk is not generated, may be widely secured using the black image of the subsidiary display unit SP without an additional black stripe pattern.

As described above, the stereoscopic image display according to the embodiment of the present disclosure can improve the luminance of the 2D image and the vertical viewing angle of the 3D image through the pixel configuration illustrated in FIGS. 6 to 8C without an increase in the number of gate lines. However, the pixel configuration according to the embodiment of the present disclosure slightly reduces the aperture ratio of the pixel. This is described in detail below.

In the embodiment of the present disclosure, both the first storage capacitor Cst1 of the main display unit MP and the second storage capacitor Cst2 of the subsidiary display unit SP are formed on the lower common line VCL1. In this instance, as shown in FIGS. 6 to 8C, a second parasitic capacitance Cgs2 remaining in the subsidiary display unit SP is more than twice a first parasitic capacitance Cgs1 remaining in the main display unit MP. The first parasitic capacitance Cgs1 is a capacitance generated between the source electrode S1 of the first TFT ST1 and the gate line GL. On the other hand, the second parasitic capacitance Cgs2 further includes a capacitance generated between the second pixel electrode Ep2 and the gate line GL and a capacitance generated between the source electrode S3 of the discharge control TFT DST and the gate line GL in addition to a capacitance generated between the source electrode S2 of the second TFT ST2 and the gate line GL.

The kickback voltage indicates a shifted voltage amount of the pixel voltage of the LC capacitor when the TFT is converted from a turn-on state to a turn-off state. The kickback voltage (i.e., the shifted voltage amount) is proportional to the parasitic capacitance Cgs. When a difference between the first parasitic capacitance Cgs1 and the second parasitic capacitance Cgs2 increases, charge characteristics of the main display unit MP and that of the subsidiary display unit SP vary each other. The storage capacitor of the display unit having the relatively large parasitic capacitance has to be designed in relatively large size, so as to secure the same charge characteristic between the main display unit MP and the subsidiary display unit SP. According to the pixel configuration according to the embodiment of the present disclosure, the second storage capacitor Cst2 is designed to be approximately three times larger than the first storage capacitor Cst1, so as to reduce a difference between the kickback voltages of the main display unit MP and the subsidiary display unit SP. Hence, in the pixel configuration according to the embodiment of the present disclosure, an area of the line unit necessarily increases between the main display unit MP and the subsidiary display unit SP. As a result, the aperture ratio of the pixel is slightly reduced.

Another embodiment of the present disclosure described below can achieve the same effect as the above-described embodiment and can increase an aperture ratio compared to the above-described embodiment of the present disclosure.

Figure 10:
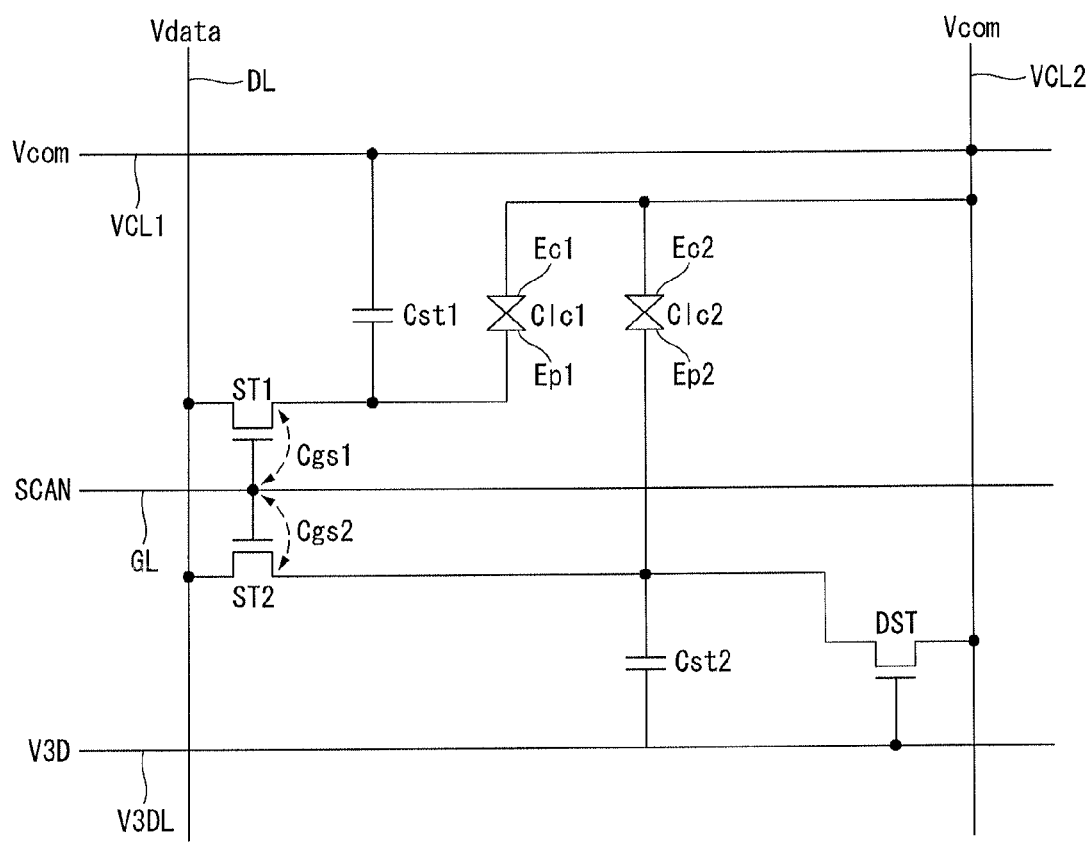
FIG. 10 is an equivalent circuit diagram of a pixel according to another exemplary embodiment of the present disclosure.
Figure 11:
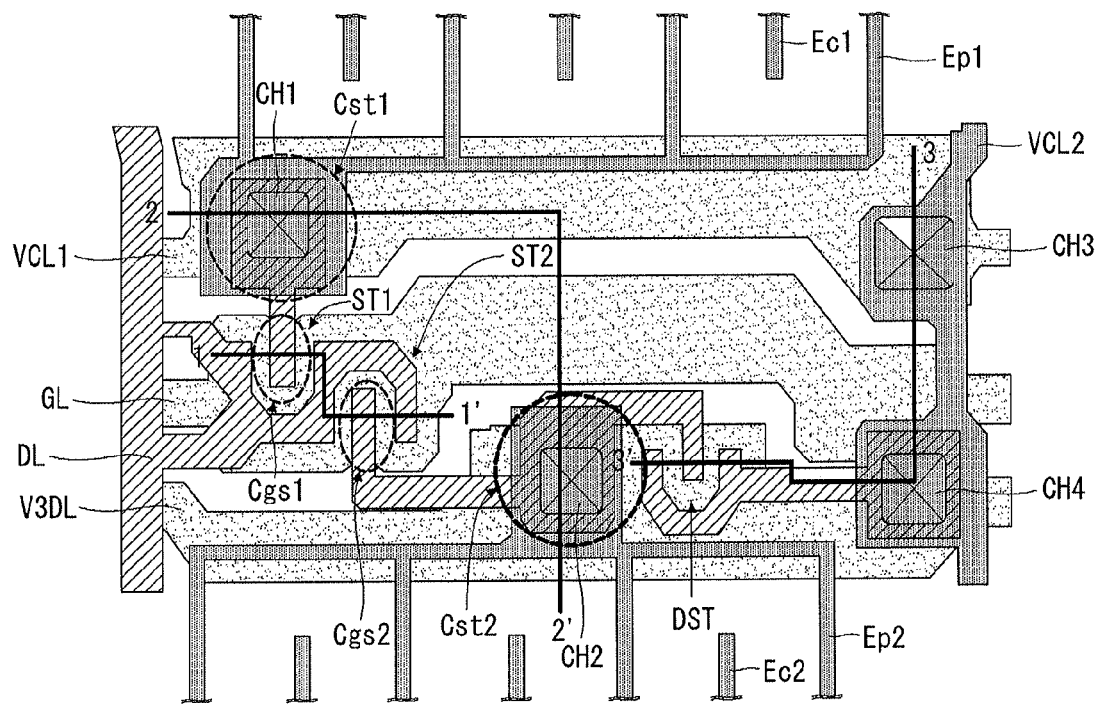
FIG. 11 illustrates a line unit of a pixel having a circuit configuration shown in FIG. 10.
Figure 12A:
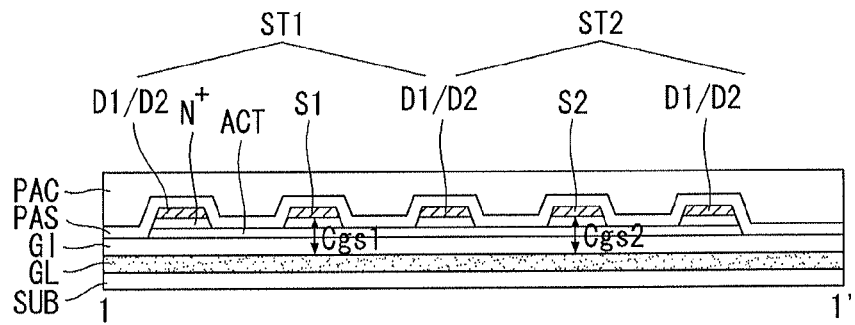
FIG. 12A is a cross-sectional view taken along line 1-1' of FIG. 11.
Figure 12B:
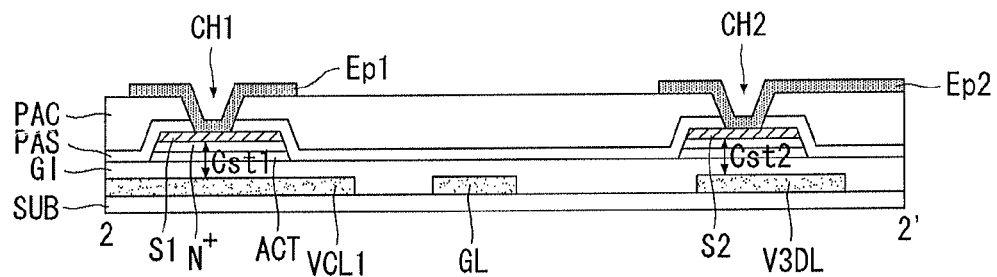
FIG. 12B is a cross-sectional view taken along line 2-2' of FIG. 11.
Figure 12C:
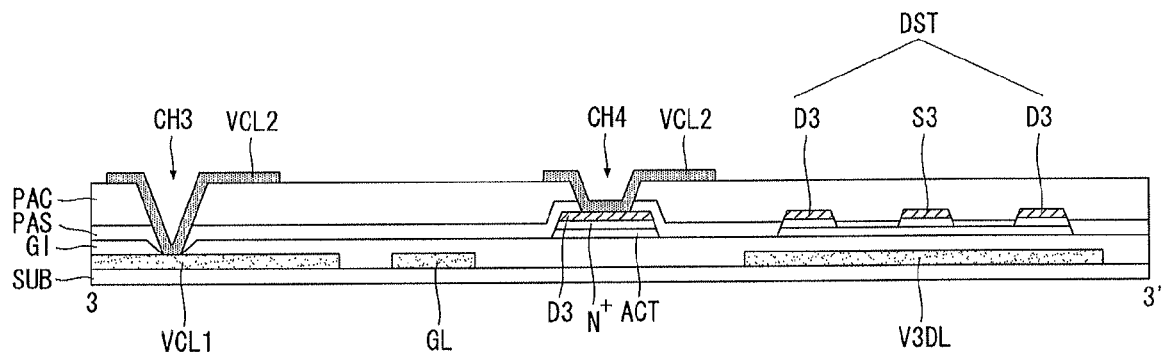
FIG. 12C is a cross-sectional view taken along line 3-3' of FIG. 11.

FIG. 10 is an equivalent circuit diagram of a pixel according to another embodiment of the present disclosure. FIG. 11 is a plane view illustrating in detail a line unit (refer to FIG. 3) of a pixel having a circuit configuration shown in FIG. 10. FIG. 12A is a cross-sectional view taken along line 1-1' of FIG. 11. FIG. 12B is a cross-sectional view taken along line 2-2' of FIG. 11. FIG. 12C is a cross-sectional view taken along line 3-3' of FIG. 11. In FIGS. 12A to 12C, 'ACT' denotes an active layer for forming a channel between a source electrode and a drain electrode of a TFT, 'N$^+$' denotes an ohmic contact layer for forming an ohmic contact between the active layer and the source electrode of the TFT and for forming an ohmic contact between the active layer and the drain electrode of the TFT, and 'SUB' denotes the lower glass substrate. The active layer ACT and the ohmic contact layer N+ constitute a semiconductor layer.

The present embodiment of the present disclosure is characterized in that a first parasitic capacitance and a second parasitic capacitance are adjusted at the same level so as to reduce the size of a second storage capacitor of a subsidiary display unit.

As shown in FIGS. 10 to 12C, a main display unit MP includes a first pixel electrode Ep1 and a first common electrode Ec1 both of which are opposite to each other and between both of which a first LC capacitor Clc1 is formed. The first pixel electrode Ep1 is connected to a data line DL through a first TFT ST1. The first TFT ST1 is turned on in response to a scan pulse SCAN from a gate line GL and thus applies a data voltage Vdata on the data line DL to the first pixel electrode Ep1. A gate electrode of the first TFT ST1 is connected to the gate line GL, a drain electrode D1 of the first TFT ST1 is connected to the data line DL, and a source electrode S1 of the first TFT ST1 is connected to the first pixel electrode Ep1 through a first contact hole CH1 formed through an organic insulating layer PAC and an inorganic insulating layer PAS. The source electrode S1 of the first TFT ST1 overlaps a lower common line VCL1 with a gate insulating layer GI and a semiconductor layer (including the active layer ACT and the ohmic contact layer N+) interposed between the source electrode S1 and the lower common line VCL1 to form a first storage capacitor Cst1. The first storage capacitor Cst1 uniformly maintains a charge voltage of the first LC capacitor Clc1 for a predetermined period Of time. The first common electrode Ec1 is connected to an upper common line VCL2 supplied by a common voltage Vcom. The upper common line VCL2 is connected to the lower common line VCL1 through a third contact hole CH3 passing through the organic insulating layer PAC, the inorganic insulating layer PAS and the gate insulating layer GI. Hence, the common voltage Vcom from the lower common line VCL1 is supplied to the upper common line VCL2.

A subsidiary display unit SP includes a second pixel electrode Ep2 and a second common electrode Ec2 both of which are opposite to each other and between both of which a second LC capacitor Clc2 is formed. The second pixel electrode Ep2 is connected to the data line DL through a second TFT ST2. The second TFT ST2 is turned on in response to the scan pulse SCAN from the gate line GL and thus applies the data voltage Vdata on the data line DL to the second pixel electrode Ep2. A gate electrode of the second TFT ST2 is connected to the gate line GL, a drain electrode D2 of the second TFT ST2 is connected to the data line DL, and a source electrode S2 of the second TFT ST2 is connected to the second pixel electrode Ep2 through a second contact hole CH2 passing through the organic insulating layer PAC and the inorganic insulating layer PAS. The drain electrode D2 of the second TFT ST2 is connected to the drain electrode D1 of the first TFT ST1. The source electrode S2 of the second TFT ST2 overlaps a discharge control line V3DL with the gate insulating layer GI and a semiconductor layer interposed between the source electrode S2 and the discharge control line V3DL to form a second storage capacitor Cst2. The second storage capacitor Cst2 uniformly maintains a charge voltage of the second LC capacitor Clc2 for a predetermined period of time. The second common electrode Ec2 is connected to the upper common line VCL2 supplied by the common voltage Vcom.

The second pixel electrode Ep2 is connected to the upper common line VCL2 through a discharge control TFT DST. The discharge control TFT DST switches on or off a current path between the second pixel electrode Ep2 and the upper common line VCL2 in response to the discharge control voltage V3D. A gate electrode of the discharge control TFT DST is connected to the discharge control line V3DL, a source electrode S3 of the discharge control TFT DST is connected to the second pixel electrode Ep2, and a drain electrode D3 of the discharge control TFT DST is connected to the upper common line VCL2 through a fourth contact hole CH4 passing through the organic insulating layer PAC and the inorganic insulating layer PAS. The source electrode S3 of the discharge control TFT DST is connected to the drain electrode D2 of the second TFT ST2.

The gate line GL, the discharge control line V3DL, and the lower common line VCL1 may be formed on the same level layer. Further, the first and second pixel electrodes Ep1 and Ep2, the first and second common electrodes Ed and Ec2 and the upper common line VCL2 may be formed on the same level layer.

In a 2D mode, when the discharge control voltage V3D of the same level as a gate low voltage VGL is applied, the discharge control TFT DST completely closes a source-drain channel of the discharge control TFT DST and cuts off the current path between the second pixel electrode Ep2 and the upper common line VCL2. In a 3D mode, when the discharge control voltage V3D of a slight-on level SOL is applied, the discharge control TFT DST partially opens the source-drain channel of the discharge control TFT DST and partially allows the current path between the second pixel electrode Ep2 and the upper common line VCL2 is formed.

Since an operation and an operation effect of the pixel according to the present embodiment are substantially the same as those of the pixel according to the above-described embodiment, a further description may be briefly made or may be entirely omitted.

In the present embodiment, the first storage capacitor Cst1 of the main display unit MP is formed on the lower common line VCL1, and the second storage capacitor Cst2 of the subsidiary display unit SP is formed on the discharge control line V3DL. Hence, capacitances (described in the above-described embodiment), which are included in a second parasitic capacitance Cgs2, that is, a capacitance generated between the second pixel electrode Ep2 and the gate line GL, and a capacitance generated between the source electrode S3 of the discharge control TFT DST and the gate line GL, are removed. Therefore, a first parasitic capacitance Cgs1 remaining in the main display unit MP and the second parasitic capacitance Cgs2 remaining in the subsidiary display unit SP are adjusted at the same level. As a result, the present embodiment can reduce the size of the second storage capacitor Cst2 of the subsidiary display unit SP, thereby reducing a width of the line unit. Further, the present embodiment can further increase the aperture ratio compared to the above-described embodiment.

Although the invention has been described with reference to a number of exemplary embodiments thereof, it should be understood that other modifications and embodiments can be devised by those skilled in the art without departing from the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A stereoscopic image display comprising:
a display panel configured to selectively display a two-dimensional plane (2D) image and a three-dimensional plane (3D) image and including a plurality of pixels; and
a patterned retarder configured to divide light from the display panel into first polarized light and second polarized light,
wherein each of the plurality of pixels includes:
a main display unit including a first pixel electrode connected to a data line through a first thin film transistor (TFT) and a first common electrode which is opposite to the first pixel electrode and is connected to an upper common line;
a subsidiary display unit including a second pixel electrode, which is connected to the data line through a second TFT and is connected to the upper common line through a discharge control TFT, and a second common electrode which is opposite to the second pixel electrode and is connected to the upper common line; and
a line unit disposed between the main display unit and the subsidiary display unit, the line unit including a gate line through which a scan pulse is commonly applied to the first TFT and the second TFT, a discharge control line through which a discharge control voltage is applied to the discharge control TFT, and a lower common line through which a common voltage is applied to the upper common line,
wherein a first storage capacitor of the main display unit and a second storage capacitor of the subsidiary display unit are formed on the lower common line.

2. The stereoscopic image display of claim 1, wherein when the 2D image is implemented, the discharge control voltage of the same level as a gate low voltage of the scan pulse is commonly applied to the discharge control TFTs of the plurality of pixels,
wherein when the 3D image is implemented, the discharge control voltage of a slight-on level, which is higher than the gate low voltage and is lower than a gate high voltage of the scan pulse, is commonly applied to the discharge control TFTs of the plurality of pixels.

3. The stereoscopic image display of claim 1, wherein the gate line, the discharge control line, and the lower common line are formed on the same level layer and cross between the main display unit and the subsidiary display unit.

4. The stereoscopic image display of claim 1, wherein the first storage capacitor is formed by a source electrode of the first TFT and the lower common line which overlap each other with a gate insulating layer interposed between them, and
wherein the second storage capacitor is formed by a source electrode of the second TFT and the lower common line which overlap each other with the gate insulating layer interposed between them.

5. A stereoscopic image display comprising:
a display panel configured to selectively display a 2D image and a 3D image, the display panel including a plurality of pixels; and
a patterned retarder configured to divide light from the display panel into first polarized light and second polarized light,
wherein each of the plurality of pixels includes:
a main display unit including a first pixel electrode connected to a data line through a first thin film transistor (TFT) and a first common electrode which is opposite to the first pixel electrode and is connected to an upper common line;
a subsidiary display unit including a second pixel electrode, which is connected to the data line through a second TFT and is connected to the upper common line through a discharge control TFT, and a second common electrode which is opposite to the second pixel electrode and is connected to the upper common line; and
a line unit disposed between the main display unit and the subsidiary display unit, the line unit including a gate line through which a scan pulse is commonly applied to the first TFT and the second TFT, a discharge control line through which a discharge control voltage is applied to the discharge control TFT, and a lower common line through which a common voltage is applied to the upper common line,
wherein a first storage capacitor of the main display unit is formed on the lower common line, and a second storage capacitor of the subsidiary display unit is formed on the discharge control line.

6. The stereoscopic image display of claim 5, wherein when the 2D image is implemented, the discharge control voltage of the same level as a gate low voltage of the scan pulse is commonly applied to the discharge control TFTs of the plurality of pixels, and
wherein when the 3D image is implemented, the discharge control voltage of a slight-on level, which is higher than the gate low voltage and is lower than a gate high voltage of the scan pulse, is commonly applied to the discharge control TFTs of the plurality of pixels.

7. The stereoscopic image display of claim 5, wherein the gate line, the discharge control line, and the lower common line are formed on the same level layer and cross between the main display unit and the subsidiary display unit.

8. The stereoscopic image display of claim 5, wherein the first storage capacitor is formed by a source electrode of the first TFT and the lower common line which overlap each other with a gate insulating layer interposed between them, and
wherein the second storage capacitor is formed by a source electrode of the second TFT and the discharge control line which overlap each other with the gate insulating layer interposed between them.

* * * * *